US007949688B2

United States Patent
Shi et al.

(10) Patent No.: US 7,949,688 B2
(45) Date of Patent: May 24, 2011

(54) METHOD OF RECORDING AND BACKTRACKING BUSINESS INFORMATION MODEL CHANGES

(75) Inventors: Shaw-Ben S. Shi, Austin, TX (US); John W. Sweitzer, Austin, TX (US); Yi-Hsiu Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 12/131,399

(22) Filed: Jun. 2, 2008

(65) Prior Publication Data

US 2009/0300077 A1    Dec. 3, 2009

(51) Int. Cl.
 *G06F 17/30* (2006.01)
(52) U.S. Cl. .. 707/803; 707/648; 707/687; 707/E17.114
(58) Field of Classification Search .......................... None
 See application file for complete search history.

(56) References Cited

U.S. PATENT DOCUMENTS

| | | | |
|---|---|---|---|
| 6,038,538 A | 3/2000 | Agrawal et al. | |
| 6,947,951 B1* | 9/2005 | Gill | 1/1 |
| 7,379,908 B2* | 5/2008 | Clancey et al. | 705/35 |
| 2004/0093244 A1 | 5/2004 | Hatcher et al. | |
| 2004/0103393 A1 | 5/2004 | Reddy et al. | |
| 2006/0161466 A1 | 7/2006 | Trinon et al. | |
| 2006/0225030 A1 | 10/2006 | Deffler | |
| 2007/0150387 A1* | 6/2007 | Seubert et al. | 705/31 |

OTHER PUBLICATIONS

C. Charlton et al., An Object-Oriented Model Design Evolution, Micro-Processing and Micro-Programming, vol. 38, No. 1-5, pp. 411-418, Sep. 1993.
R.H. Swain et al., The Workspace Manager: A Change Control System for APL, APL Quote Quad, vol. 24, No. 1, pp. 286-294, Aug. 1993.
R. Jungkyu et al., An Operation-Based Model Version Storage and Consistency Management for Fine Grained Software Objects, Journal of KISS: Software Applications, vol. 27, No. 7, pp. 691-701, Jul. 2000.

* cited by examiner

*Primary Examiner* — Cheryl Lewis
(74) *Attorney, Agent, or Firm* — Hamilton & Terrile, LLP; Stephen A. Terrile

(57) ABSTRACT

A method, system and computer-usable medium are disclosed for managing the evolution of a data model through the application of change statements. Each change statement comprises a change operator operable to perform change operations on the elements of a target data model. The change statements are appended to a data model change stack. Execution of the change statements stored in the data model change stack results in change operations being performed on the target data model. Each change statement is associated with a version ID and a timestamp which identify the scope of the data model version and time instance of the change.

17 Claims, 8 Drawing Sheets

METHOD OF RECORDING AND BACKTRACKING BUSINESS INFORMATION MODEL CHANGES

BACKGROUND OF THE INVENTION

1. Field of the Invention

Embodiments of the disclosure relate in general to the field of computers and similar technologies, and in particular to software utilized in this field. Still more particularly, it relates to a method, system, and computer-usable medium for managing the evolution of a data model.

2. Description of the Related Art

The evolution of progressively more sophisticated information processing environments has led to a corresponding increase in the quantity, diversity and complexity of the data used by today's enterprise. As a result, it has become common in recent years for companies to use data modeling to graphically model the composition, relationships and interdependencies of their business data. The resulting data models can be used for a variety of purposes, from high-level conceptual models to physical data models. However, the effectiveness of such models is highly dependent upon the integrity of their underlying business data elements.

Even simple changes to an information model can have unexpected and far-reaching affect on data compatibility, access methods, and content alignment. These, and other consequences, can have a negative impact on existing systems, application performance, business processes, and the company's bottom line. As a result, there is a corresponding reluctance to make information model changes due to fear of losing backward compatibility and destabilizing business operations. However, the need to streamline business operations, the quest for more effective business intelligence, and the implementation of new or reoriented business processes inevitably requires making changes to their associated business data. Failure to do so in a timely and effective manner can result in delayed system upgrades, sub-optimal solutions, and failure to meet business goals.

Accordingly, businesses need the ability to make safe and decisive changes to their business data models in support of data implementations, consolidation, migration, and management. Equally important, they need to efficiently record, track and manage the evolution of business data models while also being able to agilely support the implementation of the resulting changes. Current approaches to managing changes to business data models include making modifications and then saving the modified model as a new version. However, such approaches create multiple model management issues. First, there is a loss of granularity, making it difficult to determine what was changed, and when. Second, the ability to track change orders, which can be crucial for after-the-fact analysis, is limited. Third, correlating and synchronizing multiple model versions, as well as branched-off versions, becomes more difficult as changes continue to accumulate over time. Furthermore, understanding the reasoning behind the evolution of the model becomes more and more challenging. In addition to efficiently recording and managing data models as they evolve, businesses need to be able to predict the affect of the changes, as well as iteratively roll-back the model to the last known good state for recovery. These abilities would additionally enable capabilities such as change programmability, automated model simulations on programmed changes, and model simulation replays. In view of the foregoing, it would be advantageous for a businesses to gain a more thorough and complete understanding of their information assets.

BRIEF SUMMARY OF THE INVENTION

The present invention includes, but is not limited to, a method, system and computer-usable medium for managing the evolution of a data model. In various embodiments, the evolution of a data model is managed through the application of change statements. Each change statement comprises a change operator operable to perform change operations on the elements of a target data model. In these and other embodiments, the change operators include:

'+': which is used to create or add a model element or an element property

'−': which is used to remove or delete a model element or an element property

'=': which is used to set a property value of an element

In one embodiment, the change operators are applied to the elements of the underlying data modeling domain to form an atomic change statement. In other embodiments, a fully qualified change statement generated by the concatenation of a change context and an atomic change. The change context specifies where the atomic change is applied. In different embodiments, the change statements are appended to a data model change stack consisting of a sequence of fully qualified change statements that apply to a target data model. Execution of the change statements stored in the data model change stack result in change operations being performed on the target data model.

In one embodiment, each change statement in the data model change stack is associated with a backup log. The backup log stores the element deleted by a remove-delete statement or the property value overwritten by a value-set statement. The backup log is used to recover the element or property value when an old model is reconstructed from a newer model when the changes are reversed. In another embodiment, each change statement is associated with a version ID, a timestamp, or both. The version ID and the timestamp identify the scope of the committed version and time instance of the change, and are used to generate a complete model version or instance from the data model change stack. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
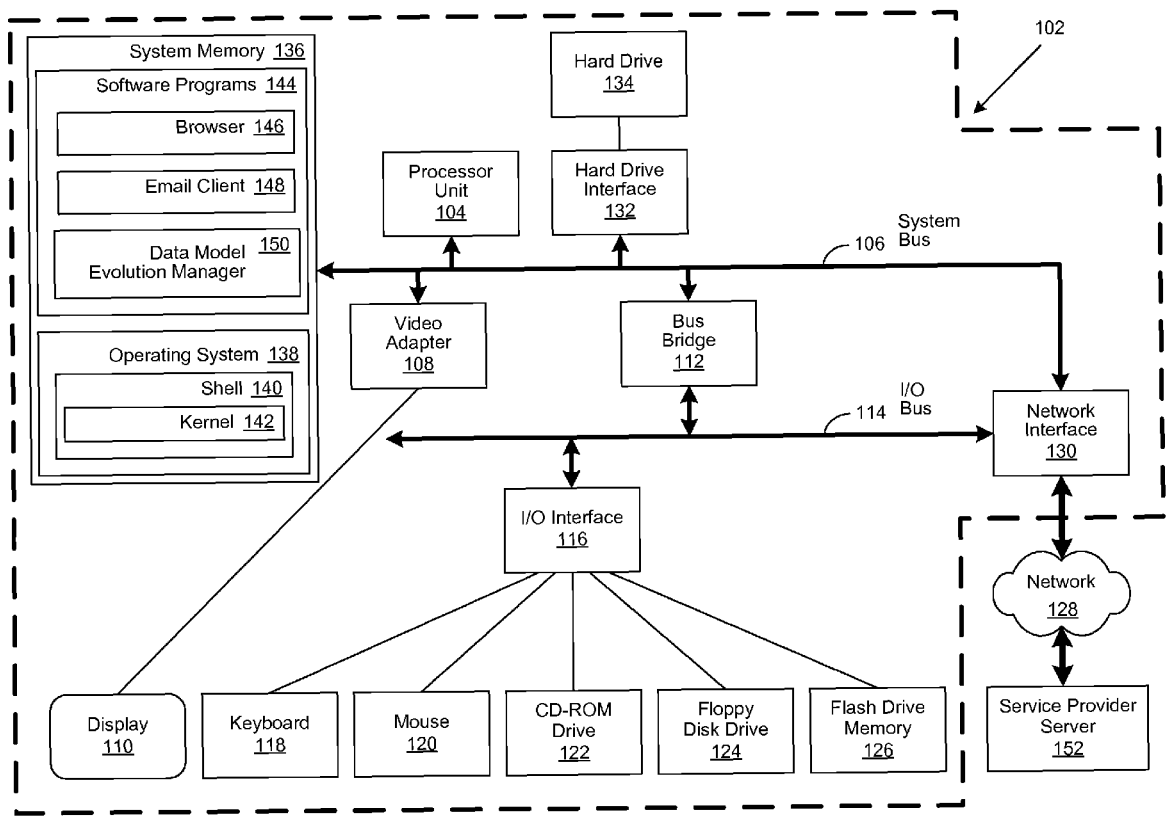
FIG. 1 depicts an exemplary client computer in which the present invention may be implemented.

A method, system and computer-usable medium are disclosed for managing the evolution of a data model. In various embodiments, the evolution of a data model is managed through the application of change statements. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a data model evolution manager 150. The data model evolution manager 150 includes code for implementing the processes described in FIGS. 2 through 5 described hereinbelow. In one embodiment, client computer 102 is able to the download data model evolution manager 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
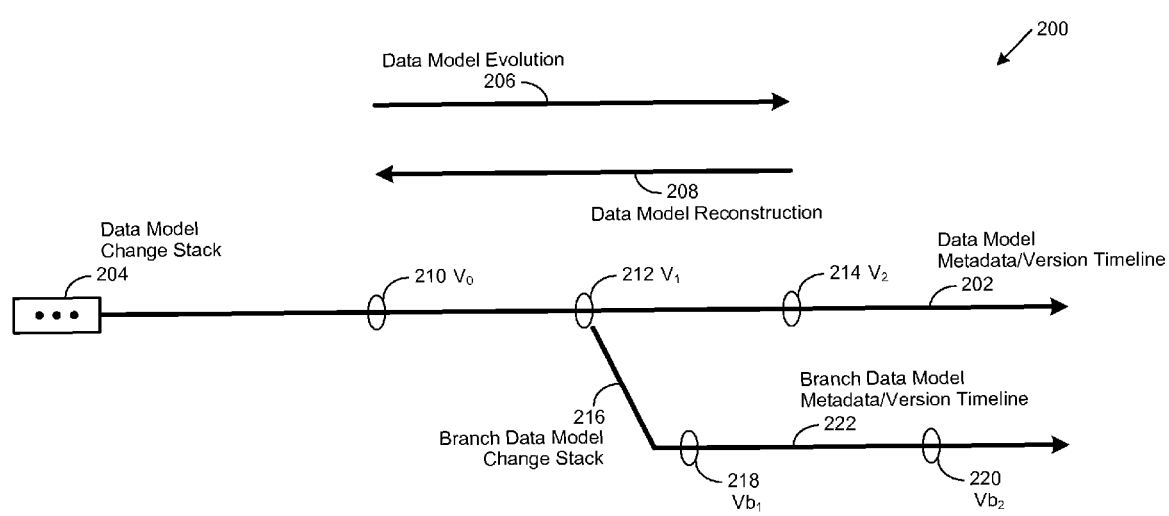
FIG. 2 shows the evolution of a data model as managed by a data evolution manager.

FIG. 2 shows the evolution of a data model 200 as managed by a data evolution manager in accordance with an embodiment of the invention. In various embodiments, the evolution of a data model 202 is managed through the application of change statements. Each change statement comprises a change operator operable to perform change operations on the elements of a target data model. In these and other embodiments, the change operators include:

'+': which is used to create or add a model element or an element property

'−': which is used to remove or delete a model element or an element property

'=': which is used to set a property value of an element

In different embodiments, the change statements are appended to a data model change stack 204 consisting of a sequence of fully qualified change statements that apply to the target data model. In one embodiment, each change statement in the data model change stack 204 is associated with a backup log. The backup log stores the element deleted by a remove-delete statement or the property value overwritten by a value-set statement. The backup log is used to recover the element or property value when an old model is reconstructed from a newer model when the changes are reversed. In another embodiment, each change statement is associated with a version ID, a timestamp, or both. The version ID and the timestamp identify the scope of the committed version and time instance of the change, and are used to generate a complete model version or instance from the data model change stack 204.

Referring now to FIG. 2, data model evolution 206 is comprised of a sequence of the change statements, described in greater detail herein, applied to the data model change stack 204. Data model instance (or version) $V_1$ 212 is the accumulation of all changes made as a result of execution of change statements from the time of the creation of the data model creation up to the time of data model instance $V_1$ 212. As additional changes are applied to $V_1$ 212 as a result of the execution of change statements, the data model is evolved to a new model, which in one embodiment is book-marked and time stamped as $V_2$ 214. In various embodiments, an instance of the data model is indexed to a corresponding change statement in the data model change stack and signified as a data model version with a bookmark.

In one embodiment, data model instance $V_0$ 210 can be re-constructed 208 from $V_1$ 212 by reversing the changes that occurred between $V_0$ 210 and $V_1$ 212 in backward order. In another embodiment, data model instance $V_0$ 210 can be constructed by accumulating all changes from the model creation time up to $V_0$ 210. In one embodiment, a branch data model change stack 216 is created at $V_1$ 212 to correspond to branch data model 222. Additional change statements are generated and appended to the branch data model change stack 216. When executed, they generate changes to the data model 202, which are signified as branch data model instance $Vb_1$ 218. Additional change statements added to the branch data model change stack 216 there after are signified as branch data model instance $Vb_2$ 220. It will therefore be appreciated that the data model change stack comprises a concise and descriptive history of all data model instances and versions. As a result, the data model change stack efficiently encodes information about the evolution of the data model without the need for redundant copies of the underlying data model itself.

Figure 3:
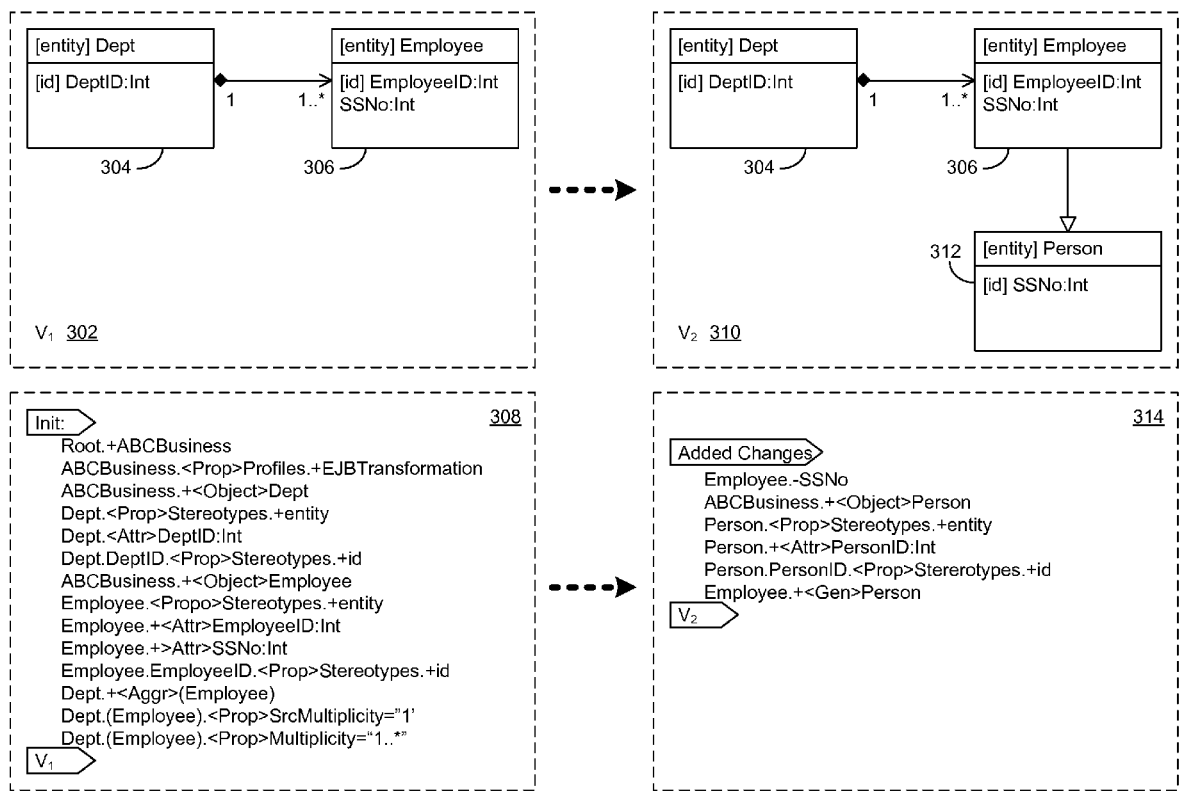
FIG. 3 shows a data evolution manager as implemented to operate in an entity object modeling domain.

FIG. 3 shows a data evolution manager as implemented to operate in an entity object modeling domain. In one embodiment, the change operators described in greater detail herein are applied to the elements of the underlying data modeling domain to form an atomic change statement. For example, the entity class modeling domain in the IBM Rational Software Architect product includes the following model element types:

"object"
"attribute"
"relationship"

When created, each element comprises a set of named properties. The 'create-add' and 'remove-delete' operators work on both the model element and model element properties. The 'set-value' operator works only on model element properties. In one embodiment, composite operators may be derived from the base change operators for higher-level atomic change operations. As an example:

+<object>Employee//create an "Employee" object class

In other embodiments, a fully qualified change statement generated by the concatenation of a change context and an atomic change. The change context specifies where the atomic change is applied. For example, the change context "Employee." is used in the following fully qualified change statement for adding an attribute to a particular object class:

Employee.+<attribute>EmployeeID.Init//create an "Employee ID" attribute of type integer Those of skill in the art will appreciate that the Employee object class would have been previously created within the context of the target data model.

Referring now to FIG. 3, the evolution of a data model in the entity object modeling domain of the IBM Rational Software Architect (RSA) product is shown. The $V_1$ 302 data model was constructed from an accumulation of changes from the model Init time. The model is evolved from $V_1$ 302 to $V_2$ 310 when additional model changes are made. The data model change stack 308 for adding an object "Dept" with a "DeptID" attribute of type integer 304, followed by the addition of an object "Employee" with a "EmployeeID" attribute of type integer 306 is as follows:

Init:
Root.+ABCBusiness
ABCBusiness.<Prop>Profiles.+EJBTransformation
ABCBusiness.+<Object>Dept
Dept.<Prop>Stereotypes.+entity
Dept.<Attr>DeptID:Int
Dept.DeptID.<Prop>Stereotypes.+id
ABCBusiness.+<Object>Employee
Employee.<Propo>Stereotypes.+entity
Employee.+<Attr>EmployeeID:Int
Employee.+>Attr>SSNo:Int
Employee.EmployeeID.<Prop>Stereotypes.+id
Dept.+<Aggr>(Employee)
Dept.(Employee).<Prop>SrcMultiplicity="1'

Dept. (Employee).<Prop>Multiplicity="1..*"
$V_2$

Figure 4:
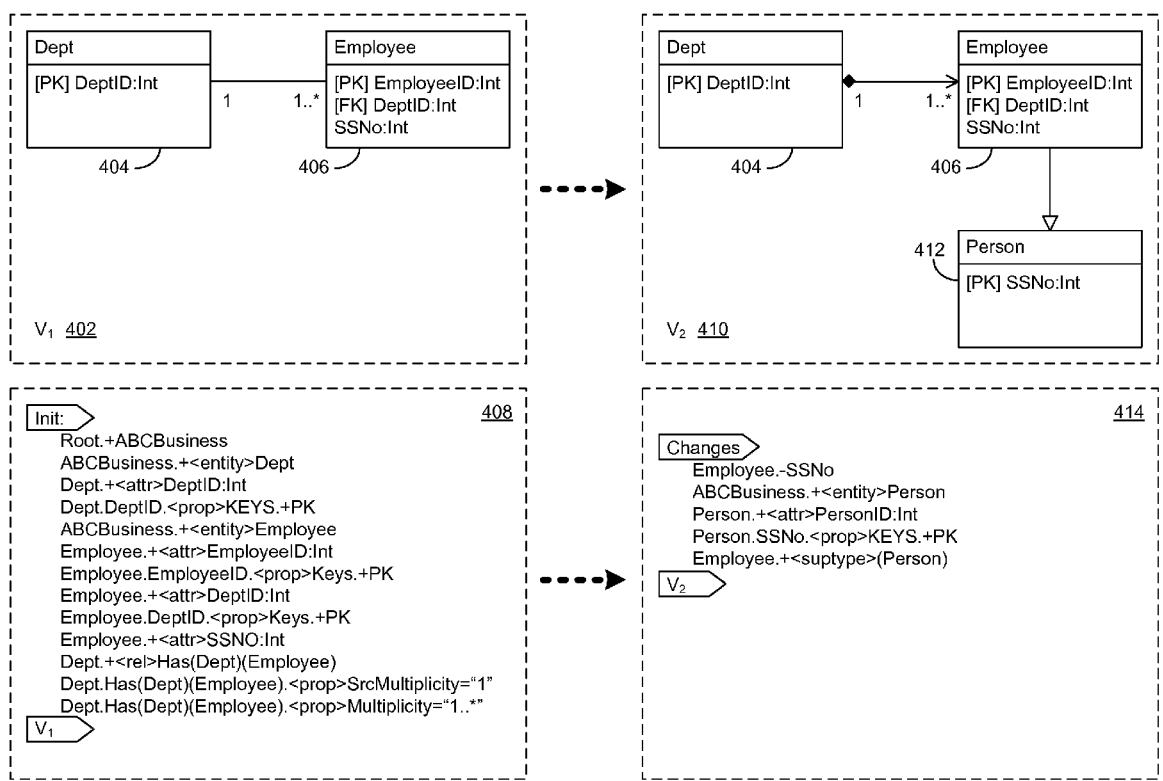
FIG. 4 shows a data evolution manager as implemented to operate in a logical data modeling domain.
Figure 5A:
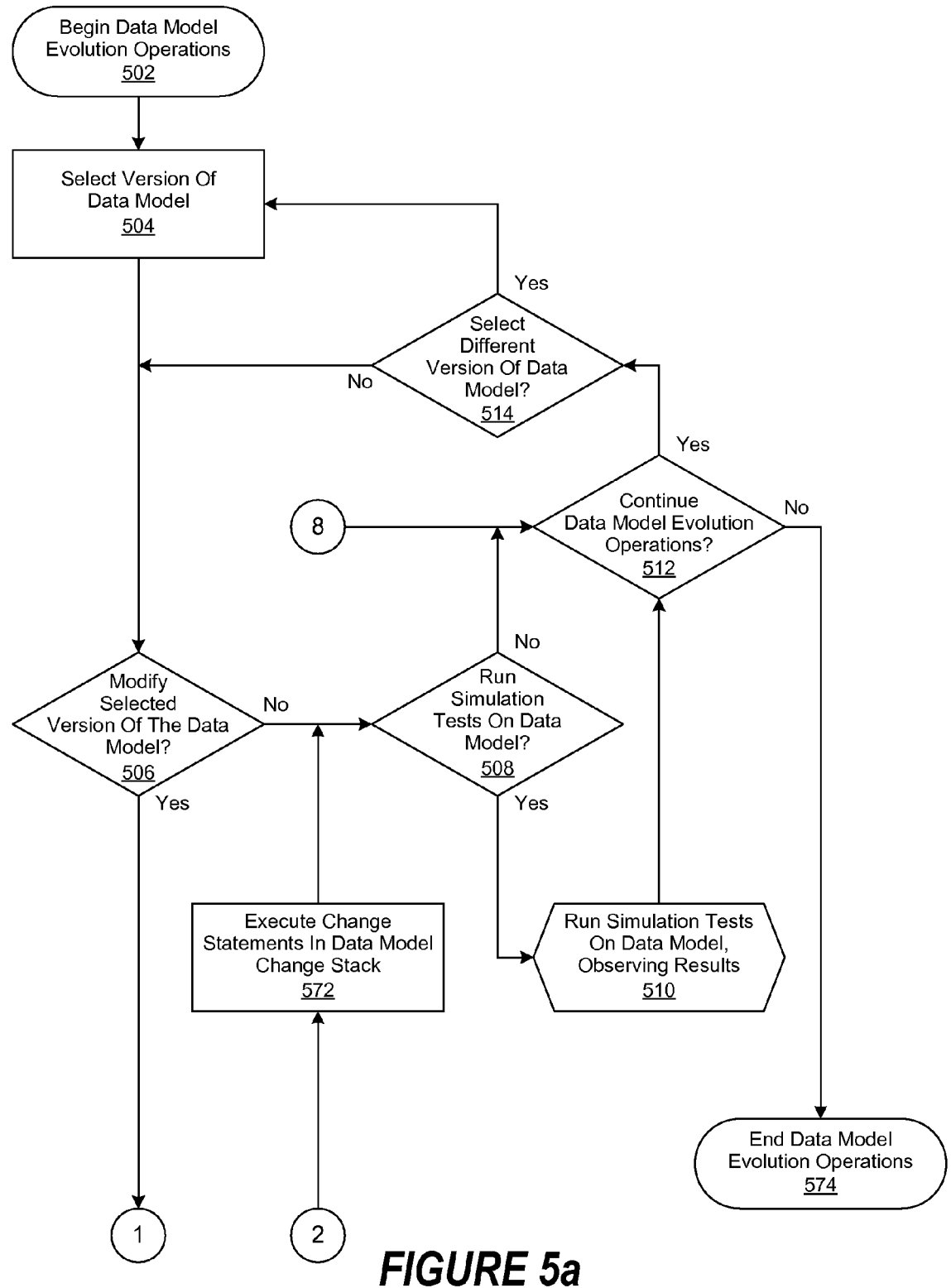
FIGS. 5*a-d* are a generalized flowchart showing an exemplary method of managing the evolution of a data model with a data model evolution manager.
Figure 5B:
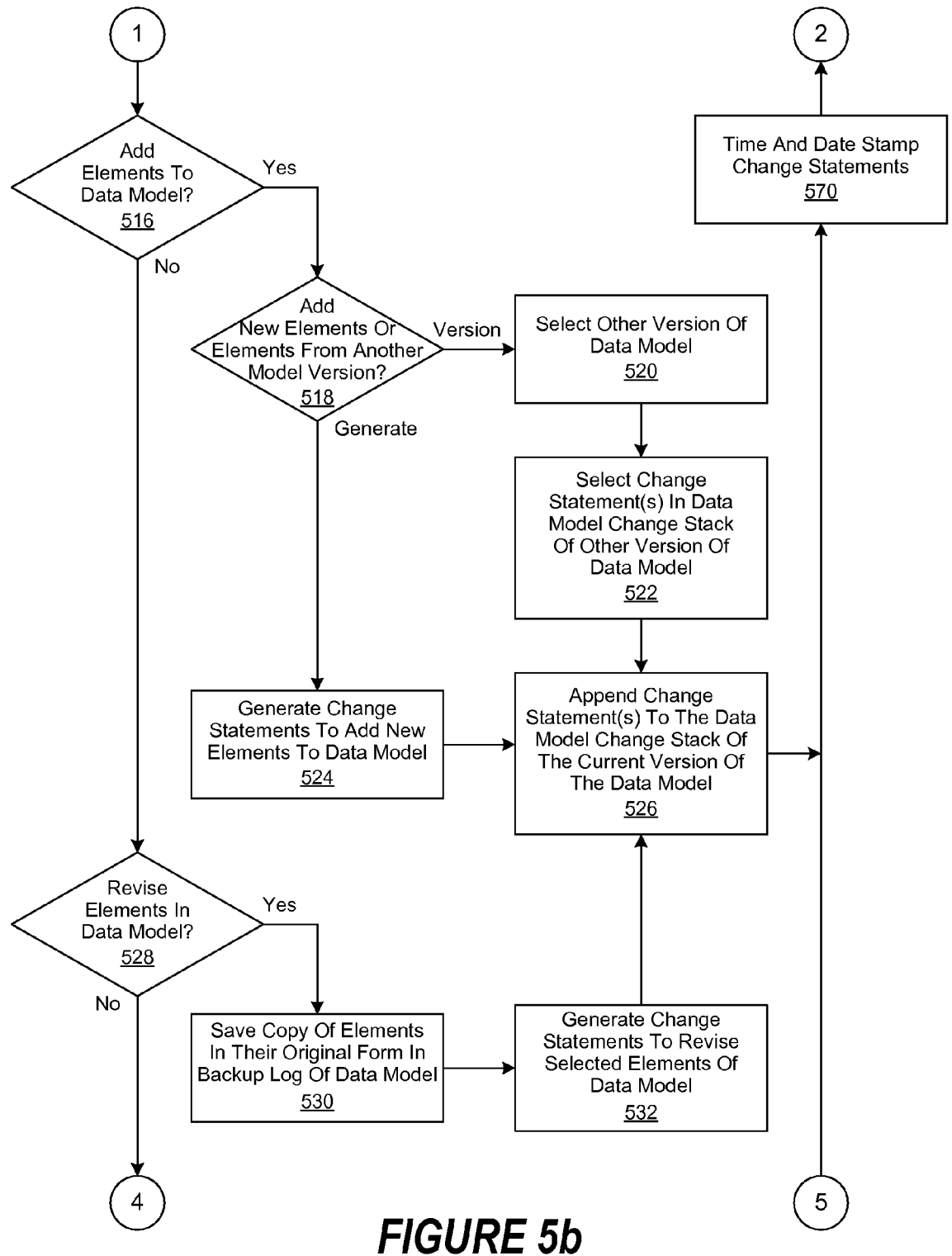
Figure 5C:
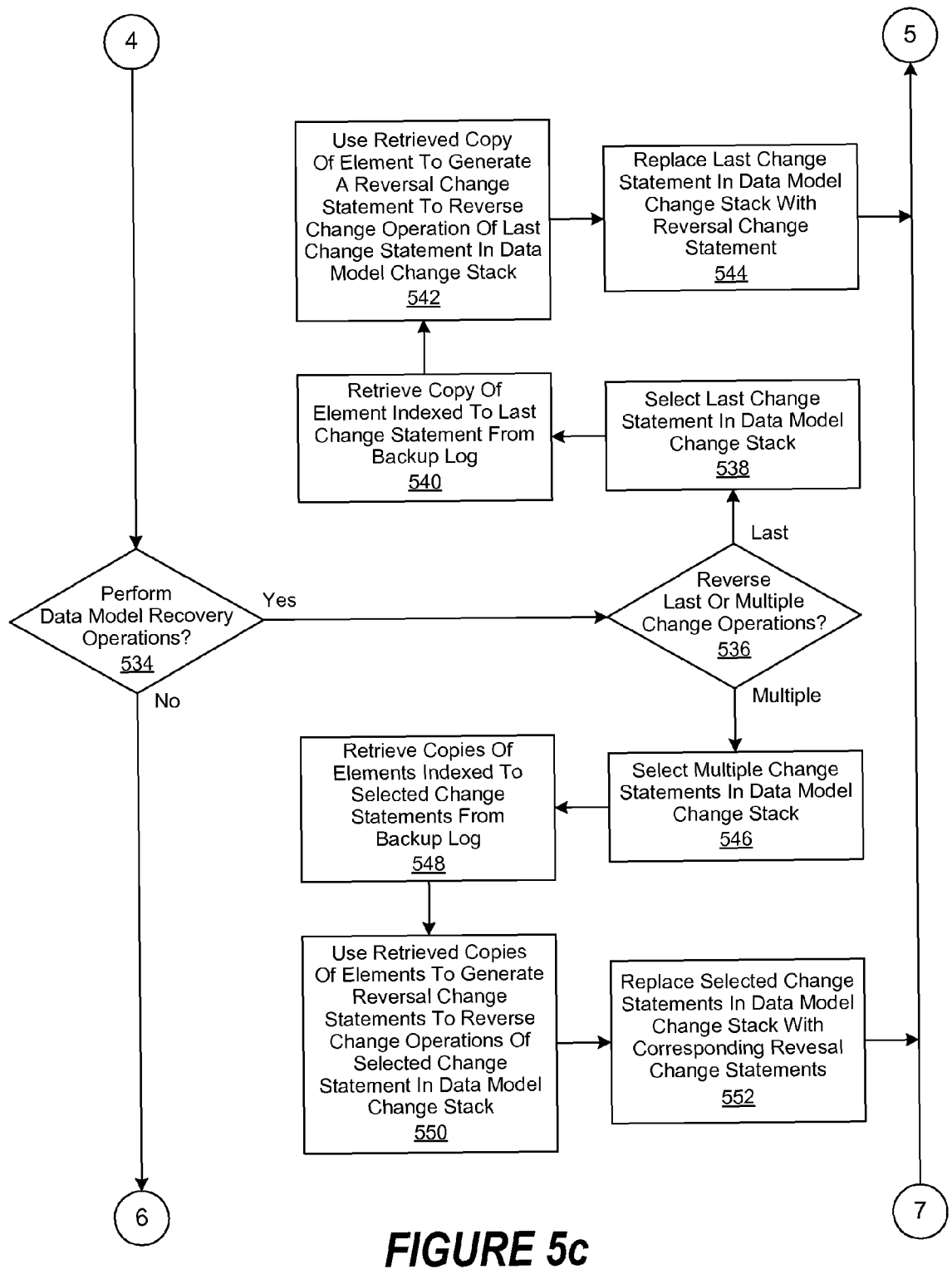
Figure 5D:
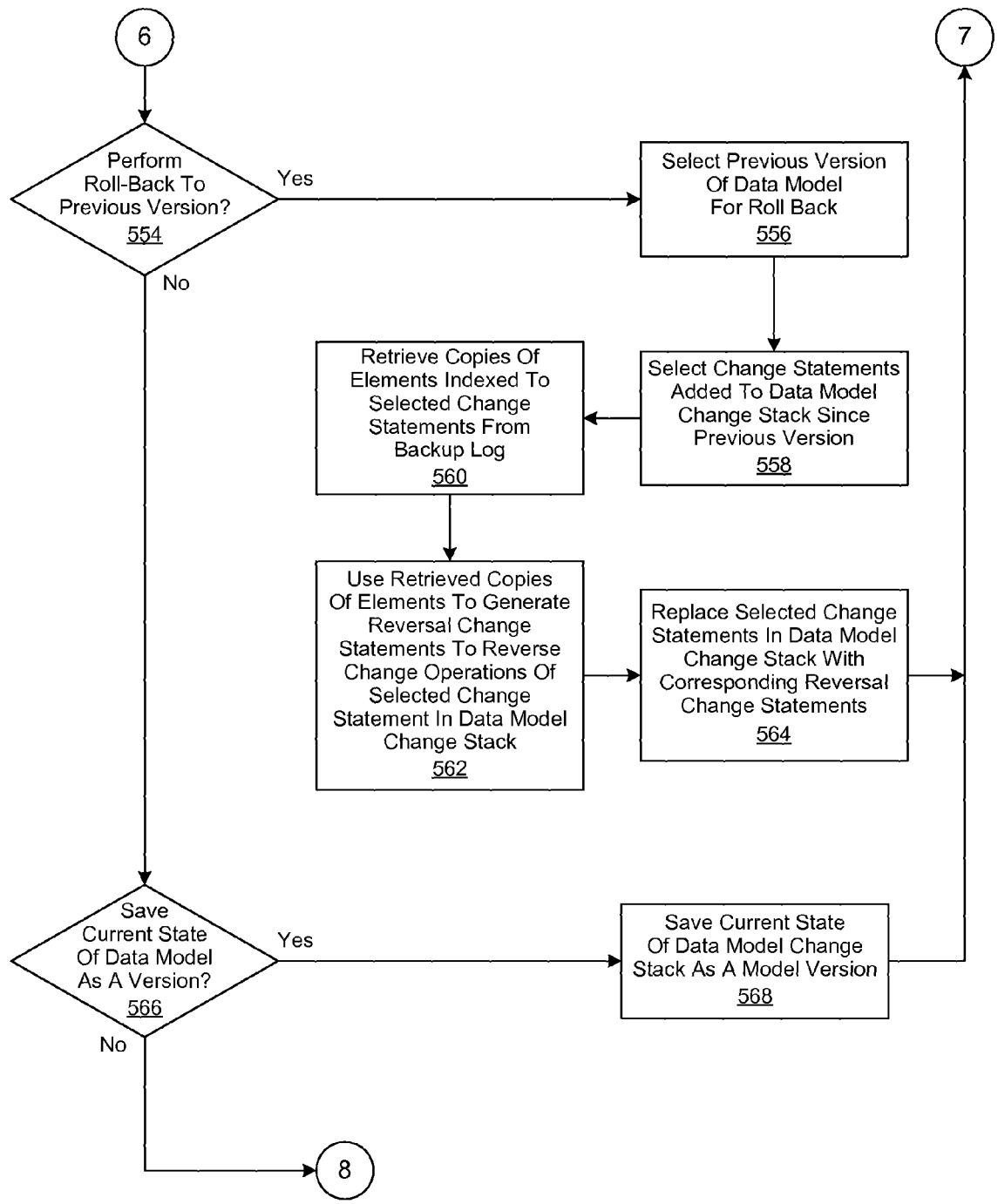

To affect the changes from data model $V_1$ 302 to $V_2$ 310, which comprise the addition of an object "Person" with a "SSNo" attribute of type integer 312, the additions to the data model change stack 314 are as follows:

Changes
Employee.-SSNo
ABCBusiness.+<Object>Person
Person.<Prop>Stereotypes.+entity
Person.+<Attr>PersonID:Int
Person.PersonID.<Prop>Stererotypes.+id
Employee.+<Gen>Person
$V_2$ FIG. 4 shows a data evolution manager as implemented to operate in a logical data modeling domain. In this embodiment, the change operators described in greater detail herein are applied to the elements of the underlying data modeling domain of the IBM Rational Data Architect (RDA) product provide by International Business Machines (IBM). This data modeling domain uses Primary Keys and Foreign Keys to identify the relationship across the data model elements, as opposed to the Id stereotype markup used in the entity object modeling domain in RSA to identify entity identity for search keys. However, the same principles for recording data model evolution apply to both domains.

The $V_1$ 402 data model was constructed from an accumulation of changes from the model Init time. The model is evolved from $V_1$ 402 to $V_2$ 410 when additional model changes are made. The data model change stack 408 for adding an object "Dept" with a "DeptID" attribute of type integer 404, followed by the addition of an object "Employee" with a "EmployeeID" attribute of type integer 406 is as follows:

Init:
Root.+ABCBusiness
ABCBusiness.+<entity>Dept
Dept.+<attr>DeptID:Int
Dept.DeptID.<prop>KEYS.+PK
ABCBusiness.+<entity>Employee
Employee.+<attr>EmployeeID:Int
Employee.EmployeeID.<prop>Keys.+PK
Employee.+<attr>DeptID:Int
Employee.DeptID.<prop>Keys.+PK
Employee.+<attr>S SNO:Int
Dept.+<rel>Has(Dept)(Employee)
Dept.Has(Dept)(Employee).<prop>SrcMultiplicity="1"
Dept.Has(Dept)(Employee).<prop>Multiplicity="1..*"
$V_1$ To affect the changes from data model $V_1$ 402 to 410 310, which comprise the addition of an object "Person" with a "SSNo" attribute of type integer 412, the additions to the data model change stack 414 are as follows:

Changes
Employee.-SSNo
ABCBusiness.+<entity>Person
Person.+<attr>PersonID:Int
Person. SSNo.<prop>KEYS.+PK
Employee.+<suptype>(Person)
$V_2$ FIGS. 5a-d are a generalized flowchart showing an exemplary method of managing the evolution of a data model with a data model evolution manager. In various embodiments, the evolution of a data model is managed through the application of change statements. Each change statement comprises a change operator operable to perform change operations on the elements of a target data model. In these and other embodiments, the change operators include:

'+': which is used to create or add a model element or an element property

'−': which is used to remove or delete a model element or an element property

'=': which is used to set a property value of an element

In one embodiment, the change operators are applied to the elements of the underlying data modeling domain to form an atomic change statement. For example, the entity class modeling domain in the IBM Rational Software Architect product includes the following model element types:

"object"
"attribute"
"relationship"

When created, each element comprises a set of named properties. The 'create-add' and 'remove-delete' operators work on both the model element and model element properties. The 'set-value' operator works only on model element properties. In one embodiment, composite operators may be derived from the base change operators for higher-level atomic change operations. As an example:

+<object>Employee//create an "Employee" object class

In other embodiments, a fully qualified change statement generated by the concatenation of a change context and an atomic change. The change context specifies where the atomic change is applied. For example, the change context "Employee." is used in the following fully qualified change statement for adding an attribute to a particular object class:

Employee.+<attribute>EmployeeID.Init//create an "Employee ID" attribute of type integer Those of skill in the art will appreciate that the Employee object class would have been previously created within the context of the target data model.

In different embodiments, the change statements are appended to a data model change stack consisting of a sequence of fully qualified change statements that apply to the target data model. In one embodiment, each change statement in the data model change stack is associated with a backup log. The backup log stores the element deleted by a remove-delete statement or the property value overwritten by a value-set statement. The backup log is used to recover the element or property value when an old model is reconstructed from a newer model when the changes are reversed. In another embodiment, each change statement is associated with a version ID, a timestamp, or both. The version ID and the timestamp identify the scope of the committed version and time instance of the change, and are used to generate a complete model version or instance from the data model change stack.

Referring now to the embodiment shown in the flowchart of FIGS. 5a-d, data model evolution operations are begun in step 502 with the initiation of a data model evolution manager. Once the data model evolution manager is initiated, a version of a data model to evolve is selected in step 504. In one embodiment, the data model is an entity object model, such as model used by the Rational Software Architect, provided by International Business Machines (IBM). In another embodiment, the data model is a logical data modes, such as the model used by the Rational Data Architect, also provided by IBM.

A determination is then made in step 506 whether the selected version of the data model is to be modified. If not, then a determination is made in step 508 whether simulation tests familiar to those of skill in the art are to be run on the selected version of the data model. If not, then a determination is made in step 512 whether data model evolution operations are to be continued. If not, then data model evolution operations are ended in step 574. Otherwise, a determination is made in step 514 whether a different version of the data model is to be selected. If so, then a different version of the data model is selected in step 504. Otherwise, the process is repeated, beginning in step 506 where a determination is made whether to modify the selected version of the data model. However, if it is determined in step 508 to run simulation tests on the data model, then they are run in step 510 and the results of the simulation tests are observed. A determination is then made in step 512 whether data model evolution operations are to be continued. If not, then data model evolution operations are ended in step 574. Otherwise, the process is continued in step 514 where a determination is made whether a different data model is to be selected.

However, if it is determined in step 506 that the selected version of the data model is to be modified, then a determination is made in step 516 whether elements are to be added to the data model. If so, then a determination is made in step 518 whether the added elements are to be added from another data model version or generated. If it is determined in step 518 that the elements are to be added from another data model version, then another data model version is selected in step 520. Change statements operable to add the desired data model elements are then selected from the data model change stack corresponding to the selected data model version. In one embodiment, the change statement comprises a change operator operable to add an element to a data model. In another embodiment, the 'create-add' change operator is operable to add a property to an element of a data model. In different embodiments, the change statement comprises an atomic change statement operable to apply the 'create-add' change operator to an element of a data model as described in greater detail herein. The selected change statements are then appended to the data model change stack of the current version of the data model in step 526. Once appended, the added change statements are time and date stamped in step 570 and the data model change stack is executed in step 572. In various embodiments, execution of the change statements results in change operations being performed on the target data elements. Once the change statements are executed in step 572, the process is repeated, beginning with step 508.

However, if it is determined in step 518 to generate the elements that are to be added to the current data model, then 'create-add' change statements are generated in step 524. Once generated, the change statements are then appended to the data model change stack of the current version of the data model in step 526. Once appended, the added change statements are time and date stamped in step 570 and the data model change stack is executed in step 572. In various embodiments, execution of the change statements results in change operations being performed on the target data elements. Once the change statements are executed in step 572, the process is repeated, beginning with step 508.

However, if it is determined in step 516 to not add elements to the data model, then a determination is made in step 528 whether elements in the current data model are to be revised. If so, then a copy of each of the target elements is saved in their original form in a backup log in step 530. As described in greater detail herein, the backup log stores the element deleted by a remove-delete statement or the property value overwritten by a value-set statement. The backup log is used to recover the element or property value when an old data model is reconstructed from a newer data model when the changes are reversed. In one embodiment, elements recorded in their original form in the change log are indexed to the respective change statements that are executed to perform the corresponding change operations. Change statements, such as a 'remove-delete' or a 'set-value' change statement as described in greater detail hereinabove, are then generated in step 532. The generated change statements are then appended to the data model change stack of the current version of the data model in step 526. Once appended, the added change statements are time and date stamped in step 570 and the data model change stack is executed in step 572. In various embodiments, execution of the change statements results in change operations being performed on the target data elements. Once the change statements are executed in step 572, the process is repeated, beginning with step 508.

However, if it is determined in step 528 to not revise elements in the current data model, then a determination is made in step 534 whether recovery operations are to be performed on the current data model. If so, then a determination is made in step 536 whether to reverse the last change in the data model or to reverse multiple changes. If it is determined in step 536 to reverse the last change to the data model, then the last change statement in the data model change stack is selected in step 538.

In step 540, the copy of the data model element indexed to the last change statement is retrieved in its original form from the backup log. The retrieved copy of the data model element is then used in step 542 to generate a change statement operable to reverse the last change operation and change the affected data model element to its original form. The last change statement is then replaced in the data model change stack in step 544 with the reversal change statement. Once replaced, the reversal change statements are time and date stamped in step 570 and the data model change stack is executed in step 572. In various embodiments, execution of the change statements results in change operations being performed on the target data elements. Once the change statements are executed in step 572, the process is repeated, beginning with step 508.

However, if it is determined in step 536 to reverse multiple change operations, then multiple change statements in the data model change stack are selected in step 546. In step 548, the copies of the data model elements indexed to the selected change statements are retrieved in their original form from the backup log. The retrieved copies of the data model elements are then used in step 548 to generate change statements operable to reverse the selected change operations and change the affected data model elements to their original form. The multiple change statements are then replaced in the data model change stack in step 550 with the reversal change statements. Once replaced, the reversal change statements are time and date stamped in step 570 and the data model change stack is executed in change operations being performed on the target data elements. Once the change statements are executed in step 572, the process is repeated, beginning with step 508.

However, if it is determined in step 534 to not perform recovery operations on the current data model, then a determination is made in step 534 whether to perform roll-back operations on the current data model. If so, then the previous version of the data model is selected in step 556 for roll-back operations. The change statements in the data model change stack that have been added since the selected data model version are then selected in step 558. In step 560, the copies of the data model elements indexed to the selected change statements are retrieved in their original form from the backup log. The retrieved copies of the data model elements are then used in step 562 to generate change statements operable to reverse the selected change operations and change the affected data model elements to their original form. The multiple change statements are then replaced in the data model change stack in step 564 with the reversal change statements. Once replaced, the reversal change statements are time and date stamped in step 570 and the data model change stack is executed in step 572. In various embodiments, execution of the change statements results in change operations being performed on the target data elements. Once the change statements are executed in step 572, the process is repeated, beginning with step 508.

However, if it is determined in step 554 to not perform roll-back operation on the current data model, then a determination is made in step 556 whether to save the current state of the data model as a version. If so, then the current state of the data model change stack is signified with a version identifier. Once signified, the affected change statements are time and date stamped in step 570 and the data model change stack is executed in step 572. Once the change statements are executed in step 572, the process is repeated, beginning with step 508. Otherwise, the process is repeated, beginning with step 512.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for managing the evolution of a data model stored in a computer memory, comprising:
    generating a first change statement operable to perform a change operation on an element of a first instance of a data model stored in a computer memory,
    appending the first change statement to a data model change stack; and
    executing the first change statement, wherein:
        the performing of the change operation generates a second instance of the data model; and
        the first change statement is indexed to the second instance of the data model as a bookmark stored in a computer memory; and wherein
    the at least one change statement comprises a change operator operable to perform one of:
    adding an element to a data model;
    deleting an element from a data model;
    adding a property to an element of a data model;
    deleting a property of an element of a data model, and
    setting the value of a property of an element of a data model.

2. The method of claim 1, further comprising:
    recording the element of the first instance of the data model in a backup log prior to execution of the first change statement, wherein the recorded element is indexed to the first change statement; and
    reconstructing the first instance of the data model from the second instance of the data model, wherein the reconstructing comprises:
        generating a second change statement operable to reverse the change operation performed by execution of the first change statement, wherein the recorded element indexed to the first change statement is used to generate the second change statement;
        replacing the first change statement in the data model change stack with the second change statement; and
        executing the second change statement.

3. The method of claim 1, wherein the change statement comprises an atomic change statement operable to apply the change operator to an element of a data model.

4. The method of claim 3, wherein the change statement comprises the concatenation of the atomic change statement to a change context, the change context specifying the target element of a data model to apply the atomic change statement.

5. The method of claim 1, wherein the first change statement comprises at least one of a version identifier (ID) and a timestamp.

6. A system comprising:
    a processor;
    a data bus coupled to the processor; and
    a computer-usable medium embodying computer program code, the computer-usable medium being coupled to the data bus, the computer program code managing the evolution of a data model and comprising instructions executable by the processor and configured for:
        generating a first change statement operable to perform a change operation on an element of a first instance of a data model;
        appending the first change statement to a data model change stack; and executing the first change statement, wherein:
the performing of the change operation generates a second instance of the data model; and
the first change statement is indexed to the second instance of the data model as a bookmark; and
wherein
the at least one change statement comprises a change operator operable to perform one of:
adding an element to a data model;
deleting an element from a data model;
adding a property to an element of a data model;
deleting a property of an element of a data model, and
setting the value of a property of an element of a data model.

7. The system of claim 6, further comprising:
recording the element of the first instance of the data model in a backup log prior to execution of the first change statement, wherein the recorded element is indexed to the first change statement; and
reconstructing the first instance of the data model from the second instance of the data model, wherein the reconstructing comprises:
generating a second change statement operable to reverse the change operation performed by execution of the first change statement, wherein the recorded element indexed to the first change statement is used to generate the second change statement;
replacing the first change statement in the data model change stack with the second change statement; and
executing the second change statement.

8. The system of claim 6, wherein the change statement comprises an atomic change statement operable to apply the change operator to an element of a data model.

9. The system of claim 8, wherein the change statement comprises the concatenation of the atomic change statement to a change context, the change context specifying the target element of a data model to apply the atomic change statement.

10. The system of claim 6, wherein the first change statement comprises at least one of a version identifier (ID) and a timestamp.

11. A tangible computer-usable storage medium embodying computer program code, the computer program code comprising computer executable instructions configured for:
generating a first change statement operable to perform a change operation on an element of a first instance of a data model,
appending the first change statement to a data model change stack; and
executing the first change statement, wherein:
the performing of the change operation generates a second instance of the data model; and
the first change statement is indexed to the second instance of the data model as a bookmark; and
wherein
the at least one change statement comprises a change operator operable to perform one of:
adding an element to a data model;
deleting an element from a data model;
adding a property to an element of a data model;
deleting a property of an element of a data model, and
setting the value of a property of an element of a data model.

12. The tangible computer-usable storage medium of claim 11, further comprising:
recording the element of the first instance of the data model in a backup log prior to execution of the first change statement, wherein the recorded element is indexed to the first change statement; and
reconstructing the first instance of the data model from the second instance of the data model, wherein the reconstructing comprises:
generating a second change statement operable to reverse the change operation performed by execution of the first change statement, wherein the recorded element indexed to the first change statement is used to generate the second change statement;
replacing the first change statement in the data model change stack with the second change statement; and
executing the second change statement.

13. The tangible computer-usable storage medium of claim 11, wherein the change statement comprises an atomic change statement operable to apply the change operator to an element of a data model.

14. The tangible computer-usable storage medium of claim 13, wherein the change statement comprises the concatenation of the atomic change statement to a change context, the change context specifying the target element of a data model to apply the atomic change statement.

15. The tangible computer-usable storage medium of claim 11, wherein the first change statement comprises at least one of a version identifier (ID) and a timestamp.

16. The tangible computer-usable storage medium of claim 11, wherein the computer executable instructions are deployable to a client computer from a server at a remote location.

17. The tangible computer-usable storage medium of claim 11, wherein the computer executable instructions are provided by a service provider to a computer usable medium of a customer computer system on an on-demand basis.

* * * * *